United States Patent
Corneau

[11] Patent Number: 6,161,860
[45] Date of Patent: Dec. 19, 2000

[54] COLLAPSIBLE AND CONVERTIBLE WALKER FOR DISABLED PERSONS

[76] Inventor: Michel Corneau, 827 Félix-Leclerc, Roberval, Canada, G8H 3J1

[21] Appl. No.: 09/265,868

[22] Filed: Feb. 11, 1999

[51] Int. Cl.[7] .............. B26D 61/06; B62M 1/00; B62B 11/00; A61H 3/00

[52] U.S. Cl. .............. 280/642; 280/62; 280/87.021; 135/67; 482/68

[58] Field of Search .............. 280/87.05, 87.051, 280/87.041, 62, 651, 655, 642, 647, 87.01, 87.021; 135/67; 482/66, 68; 297/5, 6

[56] References Cited

U.S. PATENT DOCUMENTS

| | | | |
|---|---|---|---|
| 3,312,300 | 4/1967 | Jones | 280/87.02 |
| 3,488,088 | 1/1970 | Goldberg et al. | |
| 4,239,248 | 12/1980 | Ewers | 280/87.02 |
| 4,740,004 | 4/1988 | McMullen | 280/269 |
| 4,813,664 | 3/1989 | Vroulis | 280/87.021 |
| 4,828,284 | 5/1989 | Sandgren | 280/221 |
| 4,861,051 | 8/1989 | Napper . | |
| 4,917,396 | 4/1990 | Meneses et al. | 280/267 |
| 5,158,313 | 10/1992 | Becker . | |
| 5,167,597 | 12/1992 | David . | |
| 5,538,268 | 7/1996 | Miller | 280/87.05 |
| 5,676,388 | 10/1997 | Bertrani | 280/87.041 |
| 5,694,663 | 12/1997 | Tserng | 280/655 |
| 5,732,964 | 3/1998 | Durham et al. | 280/266 |
| 5,741,020 | 4/1998 | Harroun . | |
| 5,839,740 | 11/1998 | Seeger | 280/87.021 |

*Primary Examiner*—Lanna Mai
*Assistant Examiner*—Jeff Restifo
*Attorney, Agent, or Firm*—Swabey Ogilvy Renault; Guy J. Houle

[57] ABSTRACT

A walker apparatus for disabled persons having a frame having a pair of spaced-apart wheels mounted at a front end thereof. A seat is secured to the frame rearwardly of the front end. The wheels are connected to a steering assembly having a tandem connecting linkage to cause the wheels to turn in parallel relationship. Handles are secured to the steering assembly to control the position of the wheels for guiding the apparatus during displacement thereof. A rear support wheel is secured to the frame and disposed behind the seat and substantially central between the pair of spaced apart wheels. The apparatus is motorized by the feet of the disabled person when sitting on the seat and grasping the steering handles. The walker apparatus may also be collapsible and may also be provided with a retractable pusher arm secured behind the seat whereby the apparatus may be displaced by an attendant person pushing the apparatus while the disabled person is seated on the seat with his feet disposed on a retractable foot rest plate.

14 Claims, 5 Drawing Sheets

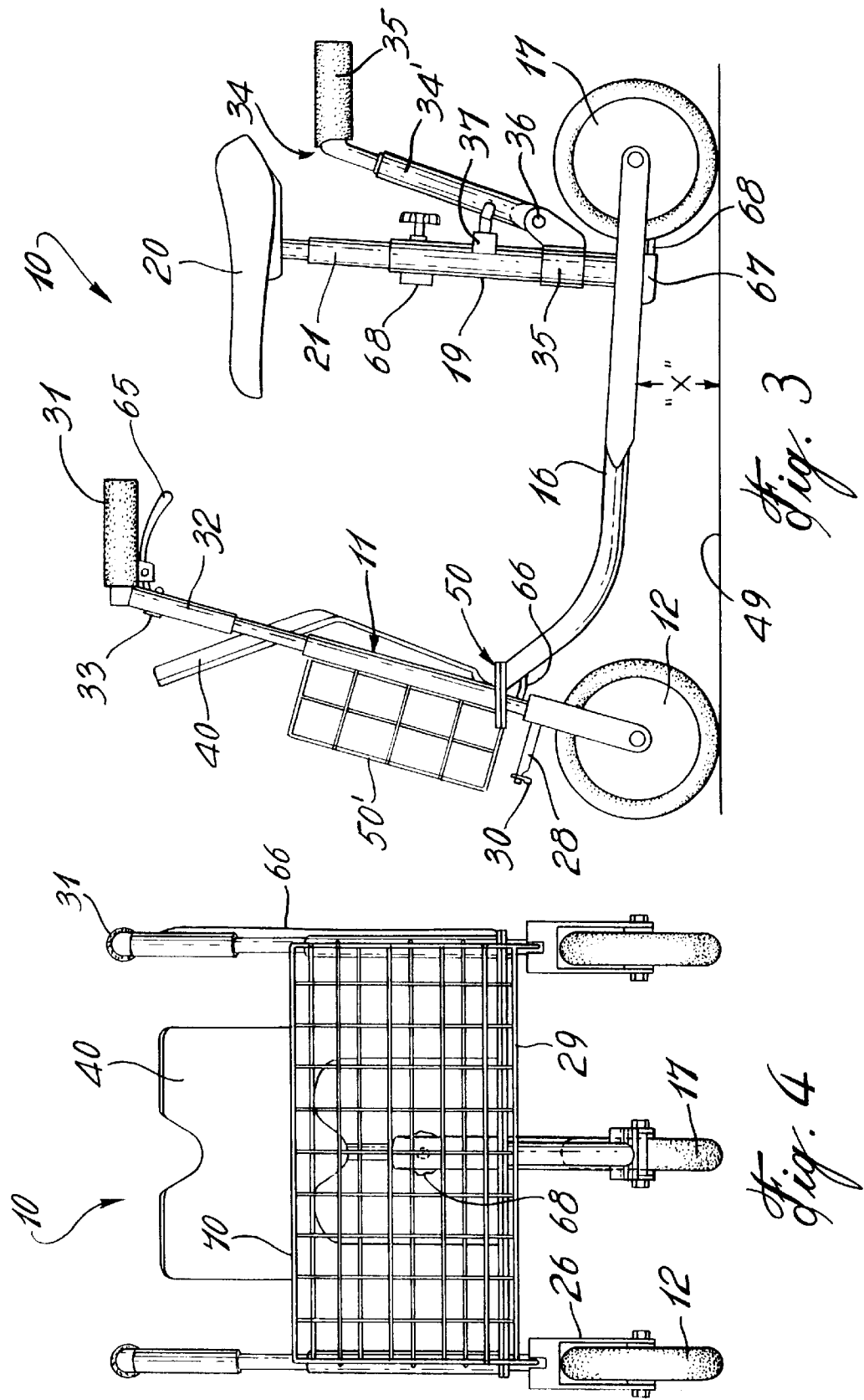

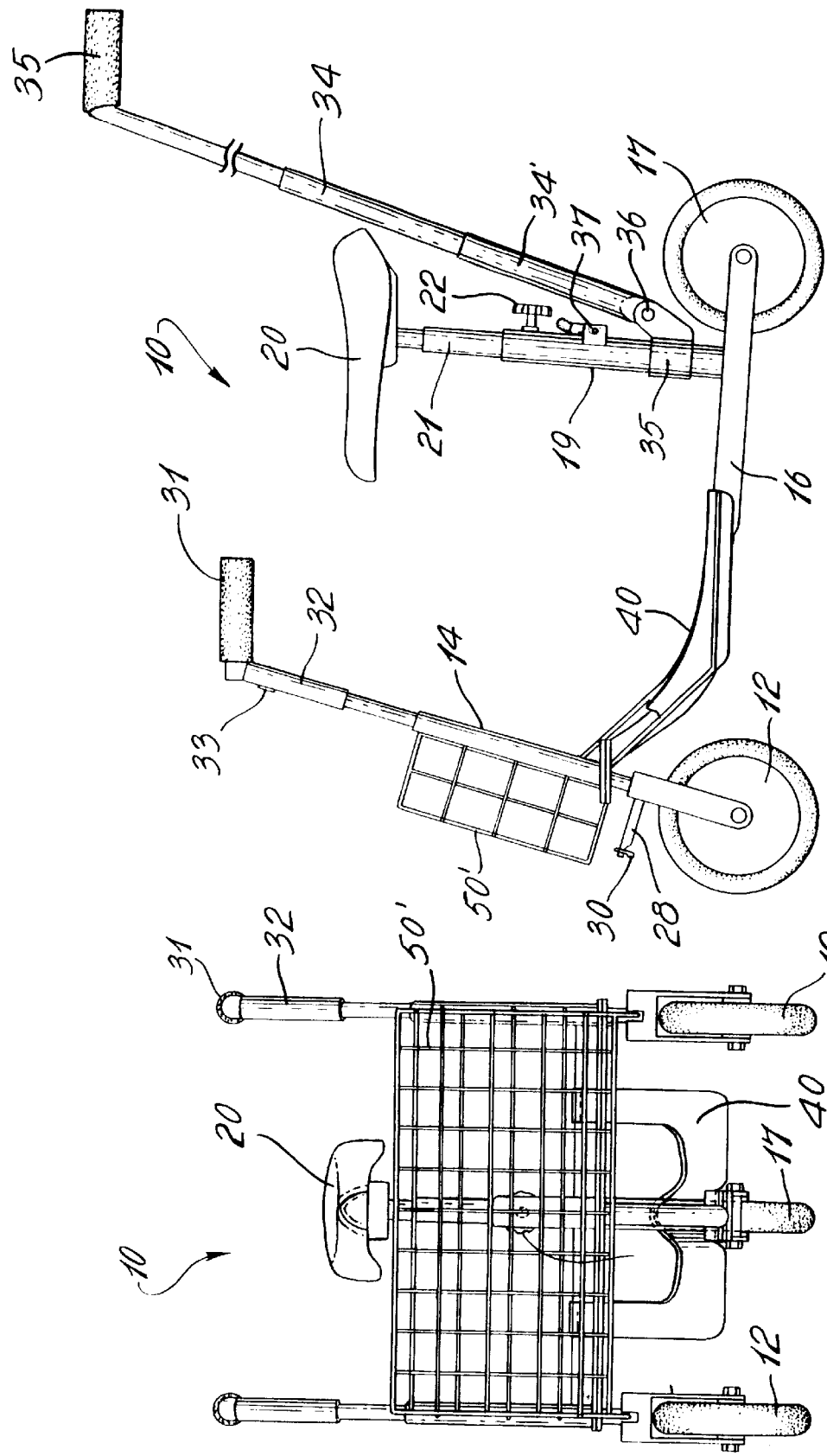

COLLAPSIBLE AND CONVERTIBLE WALKER FOR DISABLED PERSONS

TECHNICAL FIELD

The present invention relates to a walker apparatus for a disabled person and more particularly to a collapsible and convertible walker apparatus which is easy to store and transport and which may be used solely by the disabled person which imparts movement and steering of the walker or which may be displaced by an attendant person pushing on a retractable pusher arm disposed behind the apparatus.

BACKGROUND ART

Walker-type apparatus for disabled persons are known and examples of these may be found in issued U.S. Pat. Nos. 3,488,088, 4,861,051, 5,158,313, 5,167,597, and 5,741,020. There are several disadvantages to such devices, one being that they are bulky and difficult to transport, for example in the trunk of a car or on the seat of a car and most of these are not transportable on public transport vehicles such as buses and airplanes as they cannot fit in overhead storage compartments provided in such vehicles. Further, many of these apparatus resemble wheelchairs and do not provide a means for the disabled person to perform an exercise which is beneficial to his impairment. Another disadvantage of these prior art devices is that some of these, such as that disclosed in U.S. Pat. No. 5,167,597, are unstable and require the disabled operator to have dexterity in order to control same. Some of these also have their center of gravity too high. Many of these apparatus are also adapted for use by older disabled persons.

SUMMARY OF INVENTION

It is a feature of the present invention to provide a walker apparatus for disabled persons which substantially overcome the above disadvantages of the prior art.

Another feature of the present invention is to provide a walker apparatus which is collapsible and which is easy to transport and which may be used in the overhead storage compartments of aircraft or public transport vehicles, and which can easily fit in the trunk of a car or on the seat of a car and wherein it is easy to position from a storage collapse condition to a condition of use.

Another feature of the present invention is to provide a walker apparatus for disabled persons of all ages and which provide beneficial results to handicapped persons, particularly those of young age.

Another feature of the present invention is to provide a walker apparatus which is of a modern design and which does not resemble the wheelchair concept making it more appealing to the disabled user person thus achieving a greater use of the apparatus and a greater psychological benefit to the user.

Another feature of the present invention is to provide a walker apparatus of modern design and which may be used solely by disabled persons and particularly children of young age who are in school and wherein the apparatus is provided with a containment means for placing articles to be used by the disabled person.

Another feature of the present invention is to provide a walker which resembles a bicycle in design and which can be painted of colours resembling a bicycle, thereby having a psychological effect on a user disabled person, and particularly children.

Another feature of the present invention is to provide a walker apparatus which may be used solely by a disabled person or easily converted into a walker apparatus which is displaced by an attendant pushing on a telescopic arm secured to the back of the vehicle while the vehicle is steered by the disabled person and/or the attendant.

Another feature of the present invention is to provide a walker apparatus provided with a foot rest plate which is displaceable from a storage position to a position of use wherein the disabled person can rest his feet and legs while the attendant provides the motor force to displace the apparatus.

Another feature of the present invention is to provide a walker apparatus having adjustable steering arms as well as an adjustable seat whereby to adapt to handicapped persons of various stature.

Another feature of the present invention is to provide a walker apparatus which is stable while supported on three wheels with the front wheels being spaced apart and displaceable in tandem and wherein the frame of the vehicle is disposed low to the center of gravity whereby to prevent the disabled user person, who may not have perfect motor control of his legs, from having his feet caught up under the frame which could cause physical damage to the user. Accordingly, the walker apparatus is designed with a high safety standard.

Another feature of the present invention is to provide a walker apparatus which may be used by persons which are momentarily disabled, such as a person in rehabilitation.

According to the above features, from a broad aspect, the present invention provides a walker apparatus for disabled persons and comprised of a frame having a pair of spaced-apart wheels mounted at a front end of the frame. A seat is secured to the frame rearwardly of the front end. The wheels are connected to a steering assembly having a tandem connecting linkage to cause the wheels to turn in parallel relationship. Handle means is connected to the steering assembly to control the position of the wheels for steering the apparatus during displacement. A rear support wheel is secured to the frame and disposed behind the seat and substantially central between the pair of spaced-apart wheels.

According to a further broad aspect of the present invention, the walker apparatus is provided with a retractable pusher means secured behind the seat for displacing the walker apparatus while being steered by a disabled user.

According to a still further broad aspect of the present invention, the walker apparatus is provided with a foot support means to support the feet of a disabled user while the walker apparatus is being displaced by an attendant person using the pusher means.

According to another broad aspect of the present invention the walker apparatus is provided with brake means which is operable by the disabled user person to arrest the apparatus.

BRIEF DESCRIPTION OF DRAWINGS

A preferred embodiment of the present invention will now be described with reference to the accompanying drawings in which:

FIG. 3 is a side view of the walker apparatus of the present invention showing additional construction features;

FIG. 4 is a front view of FIG. 3;

FIG. 5 is a side view similar to FIG. 3 but showing the telescopic pusher arm in an extended position and the foot rest plate in a position of use;

FIG. 6 is a front view of FIG. 5;

DESCRIPTION OF PREFERRED EMBODIMENTS

Figure 1:
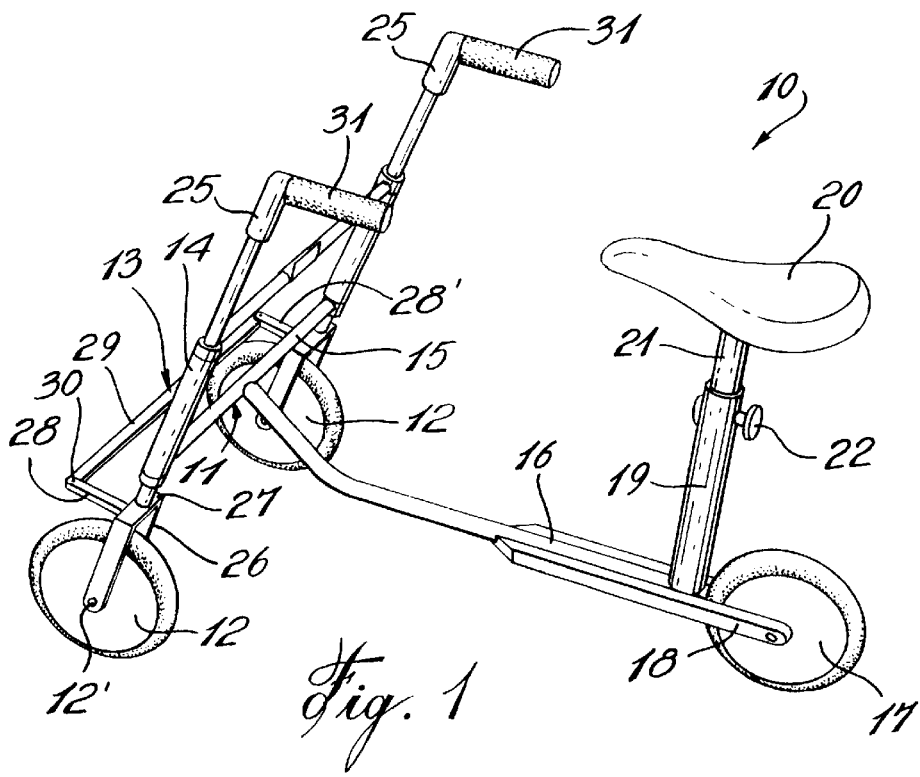
FIG. 1 is a perspective view of the walker apparatus of the present invention in its simplest form.

Referring now to the drawings, and more particularly to FIG. 1, there is shown generally at 10 the construction of the walker apparatus of the present invention suitable for a disabled user person. The apparatus comprises a frame having a front end section 11 to which is secured a pair of spaced-apart wheels 12 which are connected by a steering assembly having a tandem connecting linkage 13. The front end section also has opposed vertical guide tubes 14 and an intermediate connecting frame 15 secured between the vertical guide tubes. A rear frame section is comprised of a straight tubular frame 16 secured transversely of the intermediate connecting frame 15 and extending rearwardly from a bottom end thereof. A rear support wheel 17 is secured between a rear fork 18 of the frame 16 and disposed behind a vertical seat supporting tubular frame member. A seat 20 is mounted on a telescopic rod 21 which is received in a top end of the vertical seat support tubular frame member 19 and arrested therein at a convenient height by an arresting bolt or other suitable arresting means 22.

The steering assembly is comprised of a pair of directional rods 25 extending in a respective one of the vertical guide tubes and extending through a wheel support fork 26 to which a respective one of the wheels 12 is connected on a respective axle 12'. The lower end of the directional rod extends through the top wall 27 of the wheel support fork member 26 and attaches to an arm 28 which is welded thereto. The ends of the arms 28 and 28' are interconnected by a link rod 29 pivotally connected at opposed ends 30 to the free ends of the arms 28 and 28'. At the top end of the directional rods 25 is secured a handle 31. As shown in FIG. 3 the handles 31 are secured to a telescopically adjustable tubular support 32 which is adjustably connected at the top end section of the directional rods by attachment bolts 33 or other suitable securement means.

With further reference now to FIGS. 2 to 6, there will be described a further example of the construction of the walker apparatus 10 of the present invention. It is pointed out that the walker apparatus as shown in FIG. 1 is suitable for use solely by a disabled person as a means for displacement by the user's legs. However, as shown in FIGS. 3 to 6, the apparatus can also be provided with retractable pusher means in the form of a telescopic arm 34 which is secured to the base of the vertical seat support tubular frame 19 by a connecting bracket 35. A pivot connection 36 secures the telescopic arm 34 to the bracket thereby permitting the telescopic rod to be articulated along an arc. The pivot connection 36 may also be provided by a bolt having a wing nut whereby to secure the telescopic rod at a desired angle.

As shown in FIG. 3, when the telescopic arm 34 is not in a position of use, it is telescoped inwardly and maintained in a storage position by a catch 37 which is engaged with the top portion 34' of the telescopic rod. A handle 35 is provided at the end of the telescopic rod.

Figure 2:
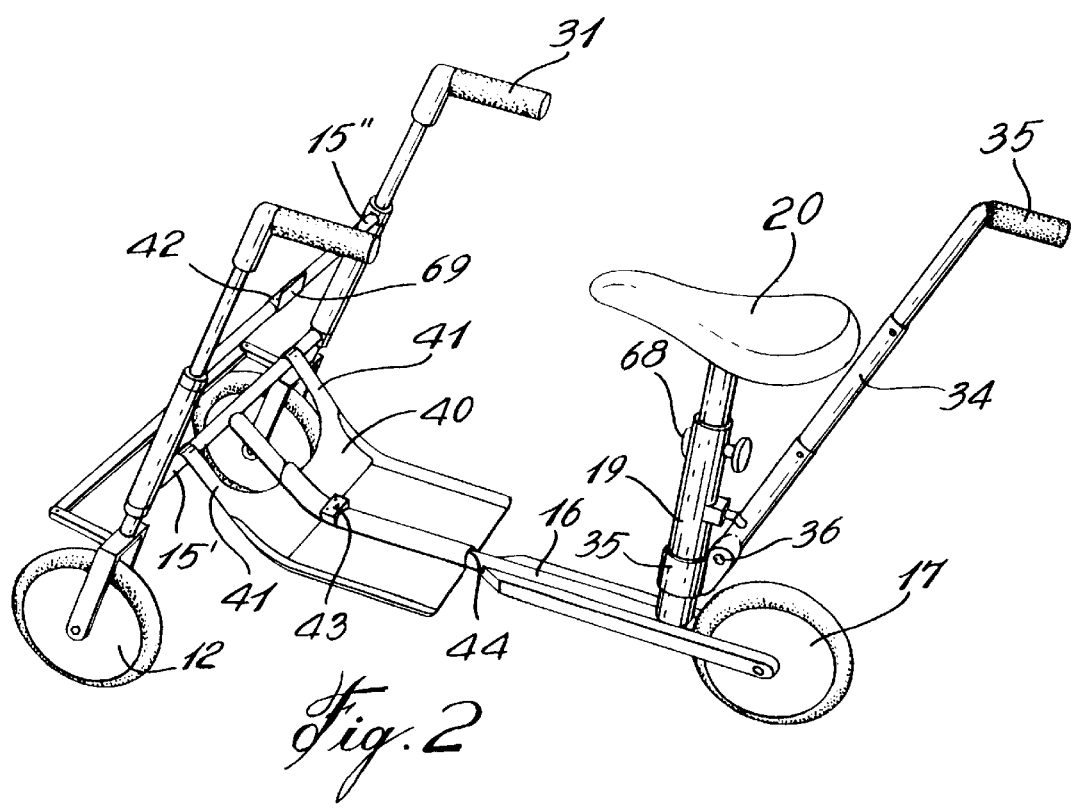
FIG. 2 is a perspective view similar to FIG. 1 but showing the apparatus provided with a telescopic pushing arm and a foot rest plate for the disabled user whereby the apparatus may be displaced by an attendant person much like a wheelchair.
Figure 7:
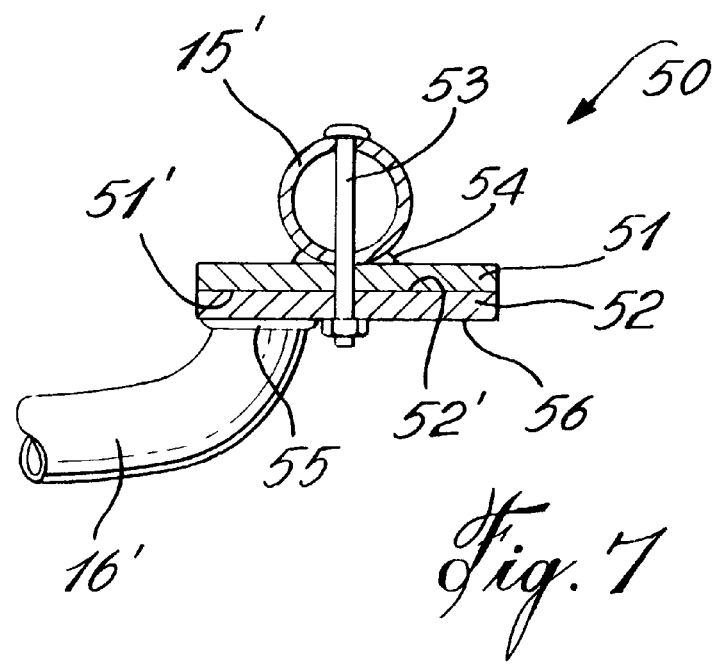
FIG. 7 is a side view, partly fragmented, showing the pivotal connection between the front end of the frame and the straight rear portion of the frame.

As also seen from FIGS. 2 to 6, a foot rest plate 40 is also secured to the frame. As hereinshown it is connected by hinge arms 41 to a lower tubular member 15' of the intermediate connecting frame 15 and is hingeable upwardly to a storage position, as shown in FIG. 3. The foot rest plate 40 is maintained in the storage position by attachment means in the form of a Velcro patch 42 glued to the top tubular rod 15" and a Velcro patch 43 appropriately secured centrally of the foot rest plate 40. The central part of the foot rest plate is formed with a bottom channel 44 to support and position same centrally on the straight tubular frame 16. Accordingly, if the disabled user is tired, the foot rest plate is brought downwardly to its position of use as shown in FIG. 2 and an attendant person will displace the walker apparatus by the pusher telescopic arm 34.

Another feature of the walker apparatus 10 of the present invention is that it may be provided with a basket 50' in the front end of the apparatus and between the vertical guide tubes 14. The basket provides a means to store various articles of the disabled user person. For example, if the person is a child attending school, the child will place his school supplies and books in the basket. It is also convenient when shopping.

As shown in FIG. 3, the straight tubular frame 16 is disposed a distance "x" from the floor surface 49 and this distance "x" is selected to prevent the disabled user person from accident by having its feet wedged under the frame during movement. It also provides a low center of gravity. The frame is low enough that the footwear of the user is deflected to the sides of the straight tubular frame 16. It is also clear from FIG. 3 that when the foot rest plate 40 is in its storage position, it clears the foot area to opposed sides of the frame 16 in the frontal area of the seat 20.

Figure 8:
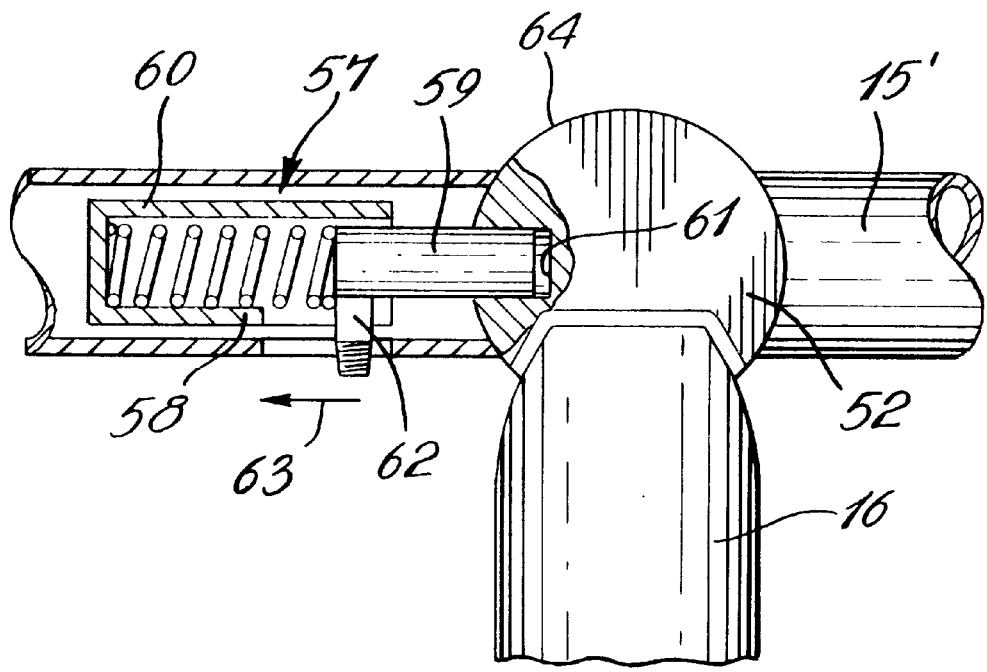
FIG. 8 is a bottom view of the pivotal connection illustrating the construction of the disengageable lock for collapsing the frame.

With reference now to FIGS. 3, 5, 7 and 8, there is shown the construction of the pivot connection 50 which interconnects the front end section 11 of the frame to the straight tubular rear frame 16. This pivotal connection 50 is better illustrated in FIG. 7 and as can be seen it consists of two circular discs, namely a top disc 51 and a bottom disc 52 interconnected in frictional juxtaposed contact with one another along serrated faces 51' and 52' by a rod 53. The rod 53 extends through the lower tubular frame 15' of the intermediate connecting frame 15 and is welded thereto at 54. The bottom disc 52 is connected to the front end 16' of the straight tubular frame 16 and it is welded at 55 to the underface 56 of the bottom disc 52. These two discs are interlocked together by a disengageable lock mechanism 57 as shown in FIG. 8 whereby the intermediate tubular frame member 15' and the straight rear tubular frame 16 are at right angles to one another.

As shown in FIG. 8, the disengageable lock mechanism 57 is mounted in a housing 58 on the underside of the tubular frame 15' and a latch bolt 59 is spring-biased by helical spring 60 in an engaged position wherein the bolt 59 extends out of the housing and into an engageable slot 61 formed in the bottom disc 52. When in this position the lower tubular intermediate frame member 15' and the rear straight tubular frame 16 are at right angles to one another, as previously described. In order to release the bolt 59 from engagement within the slot 61, a retracting lever 62 is pulled rearwardly in the direction of arrow 63 to retract the bolt against the spring action. When the bolt is retracted, the straight tubular frame 16 may be hinged sideways towards the front end section 11 of the frame or the tubular member 15'. Because the bolt 59 is biased against the outer periphery 64 of the bottom disc 52 it will re-enter the engaging slot as soon as the slot is disposed thereagainst and automatically locking the frame sections in proper transverse alignment.

It is important to point out that it is essential for the wheels at the front end to be connected in tandem. If the wheels were simply freely pivotal, the user could not be able to properly steer the walker apparatus and could be faced with the danger of the apparatus tumbling down a staircase. As an added safety, the walker apparatus is provided with brake means in the form of a brake lever 65 connected adjacent one of the handle grips 31 as shown in FIG. 3. The brake lever 65 is attached to a brake actuating wire 66 which extends under the front end section 11 of the frame and into the straight tubular frame 16. The other end of the brake actuating wire 66 is secured to a brake pad actuating mechanism 67 secured under the straight tubular frame 16 and the rear end thereof adjacent the rear wheel 17. A brake pad 68 extends out of the brake actuating mechanism and by pulling the lever 65 the brake pad is actuated to brake the rear wheel.

Figure 9:
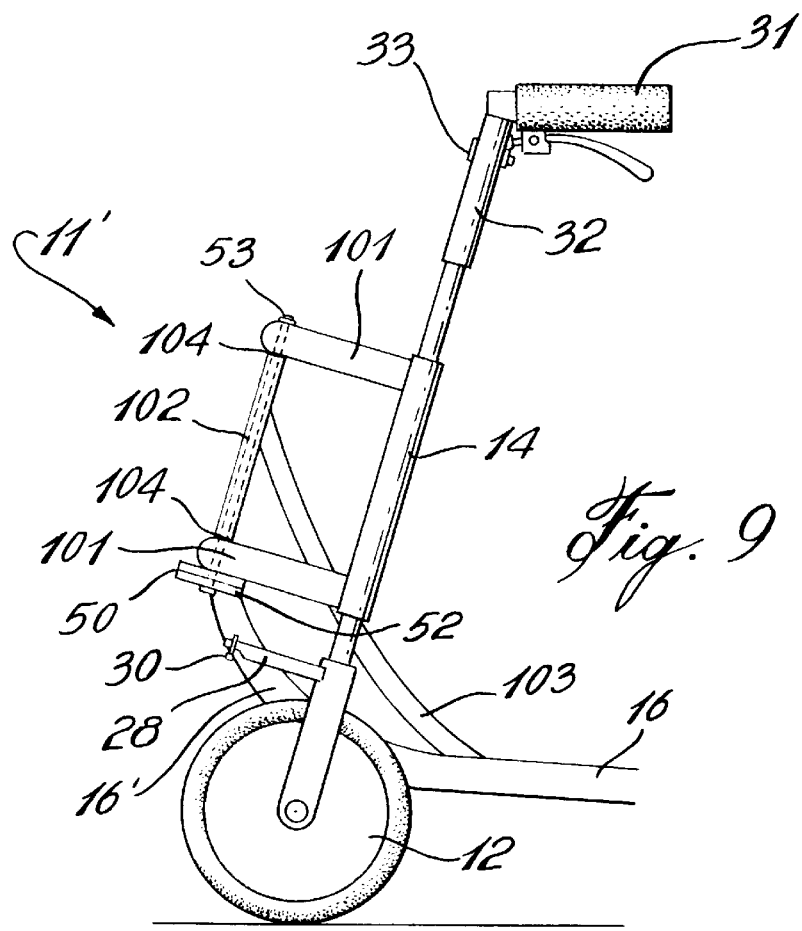
FIG. 9 is a view of the front end section of the walker apparatus showing an improvement to the intermediate connecting frame thereof.
Figure 10:
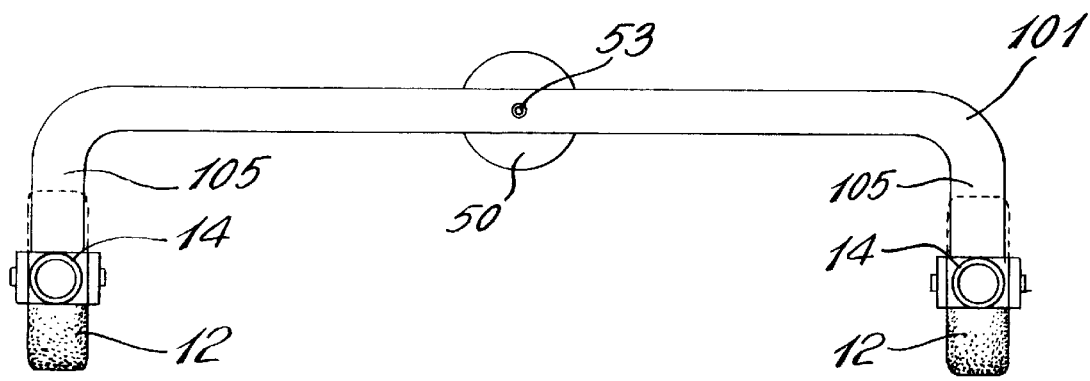
FIG. 10 is a plan view of the U-shaped tubular frame.

Referring now to FIGS. 9 and 10, there is shown a modification to the front end section 11' of the walker apparatus. As hereinshown, the intermediate connecting frame is constituted by a pair of U-shaped tubular frame members 101 which define opposed side arms 105 with their free ends welded onto the pair of guide tubes 14. The purpose of these U-shaped tubular frame members 101 is to locate the pivotal connection 50 forwardly of the wheels 12 to improve on the stability of the walker device. Accordingly, the rod 53 is an elongated rod extending through an intermediate channel member 102 which is provided at opposed ends with washers 104 and interconnects the U-shaped tubular frame with the pivotal connection 50 as previously described. The tubular frame 16 also has a forward arcuate extension section 161 which connects to the bottom disk 52 as previously described. The intermediate tubular member 102 is immovably connected to the main tubular frame 16 by an intermediate frame member 103 welded therebetwen. Like the walker apparatus illustrated in the other drawings, the disengageable lock mechanism 57 is provided whereby to hinge the straight tubular frame member 16 sideways towards the front end section 11 of the frame, herein the U-shaped tubular frame to transport and store the walker apparatus of the present invention.

Because of the construction and design of the walker apparatus 10 of the present invention and the fact that it may be painted with modern-type colours and designs resembling a bicycle, it has been found that disabled children quickly develop an interest in the apparatus and enjoy its use. While doing so they exercise their muscles thus undergo physical therapy and it has been found that this therapy has greatly helped and reduced their anticipated muscular deterioration. The design of the apparatus has been found to have a psychological effect on the patient as the patient feels that he does not look like a handicapped person, as would be the case if he was sitting in a wheelchair and being moved about by an attendant person. In fact, the patient prefers to be left alone on such apparatus and to motorize it himself, thus this psychological effect also results in a physical and beneficial exercise. It has been found that handicapped children with such walker apparatus can be autonomous in schools and displace themselves from classroom to classroom following other children and have the ability to utilize the storage basket as a means of transporting their schoolbooks, etc. It is also simple for the parents of these young adults to transport them to and from school due to the collapsible and storable construction of the apparatus. To provide ease of transportation there are also provided strap loops and namely strap loop 69 connected to the transverse intermediate rod 15" and a further strap loop 68 secured to the vertical seat support tubular frame member 19 under the seat 20, as shown in FIG. 2. A strap is hooked around these loops 68 and 69 and acts as a shoulder support for the vehicle. The apparatus is also dimensioned so that in its collapsed condition, it can be stowed in overhead storage compartments of aircraft.

It is within the ambit of the present invention to cover any obvious modifications to the examples of the preferred embodiment described herein, provided such fall within the scope of the appended claims.

What is claimed is:

1. A walker apparatus for disabled persons comprising a frame having a pair of spaced-apart wheels mounted at a front end of the frame, a seat secured to said frame rearwardly of said front end, said wheels being connected to a steering assembly having a tandem connecting linkage to cause said wheels to turn in parallel relationship, handle means connected to said steering assembly to control the position of said wheels for steering said apparatus during displacement, a rear support wheel secured to said frame and disposed behind said seat and substantially central between said pair of spaced-apart wheels, said frame being a collapsible frame having a front frame section Provided with opposed vertical guide tubes and an intermediate connecting frame immovably secured thereto, each said wheels of said pair of spaced-apart wheels being rotatable supported by a fork member, said fork member being secured to the base of a control rod, said control rod extending through a respective one of said vertical guide tubes and axially rotatable therein, a handle grip at a top end of said control rod and constituting said handle means, and a rear straight frame section pivotally connected to said intermediate connecting frame on a pivot connection substantially midway between said vertical end tubes, said pivot connection having a disengageable lock, said straight frame section being displaceable on said Divot connection towards said front frame section to position said frame sections to a compact storage position.

2. A walker apparatus as claimed in claim 1 wherein there is further provided retractable pusher means secured behind said seat for displacing said walker apparatus while being steered by a disabled user.

3. A walker apparatus as claimed in claim 2 wherein there is further provided foot support means to support the feet and legs of a disabled user while said walker apparatus is being displaced by an attendant person using said pusher means.

4. A walker apparatus as claimed in claim 3 wherein said foot support means is a foot rest plate hingedly connected to said frame and displaceable from a storage position away from obstructing the user leg area to a position of use where it is supported by said frame at an elevated position in said leg area.

5. A walker apparatus as claimed in claim 2 wherein there is further provided a containment means secured to said front end of said frame above said tandem connecting linkage.

6. A walker apparatus as claimed in claim 2 wherein said frame has opposed vertical guide tubes and an intermediate connecting frame, a pair of U-shaped tubular frame members connected spaced apart across said vertical guide tubes and extending forwardly thereof, said frame having a straight frame section extending forwardly of said pair of spaced-apart wheels and connected to said U-shaped tubular frame members through a connecting linkage.

7. A walker apparatus as claimed in claim 6 wherein said connecting linkage is a pivotal linkage.

8. A walker apparatus as claimed in claim 1 wherein there is further provided foot support means to support the feet and legs of a disabled user while said walker apparatus is being displaced by an attendant person using said pusher means.

9. A walker apparatus as claimed in claim 8 herein said intermediate connecting frame has a lower transverse bar, said foot support means being a foot rest plate pivotally secured to said lower transverse bar and hingeable upwardly to a storage position between said vertical end tubes, said foot rest plate resting on said rear frame section when in a position of use, and securement means to maintain said foot rest plate at said storage position.

10. A walker apparatus as claimed in claim 1 wherein a seat support frame is secured to said straight frame section adjacent a rear end thereof, said seat support frame being a tubular frame receiving therein a straight adjustment rod having a seat secured at a top end thereof, said straight adjustment rod being adjustably connected in said tubular frame to fix the position of said seat to adjust to the stature of the disabled user.

11. A walker apparatus as claimed in claim 10 wherein a wheel support fork is secured to said rear end of said straight frame, said pusher means being an extendible arm secured to a pivot connection provided at a lower end of said seat support frame, and handle means at a top end of said extendible arm, and means to maintain said extendible arm in a storage position behind said seat when not required.

12. A walker apparatus as claimed in claim 1 wherein there is further provided brake means operable by a disabled user to arrest said apparatus.

13. A walker apparatus as claimed in claim 12 wherein said brake means is comprised by a brake lever connected adjacent one of said handle grips connected to one of said control rods, said brake lever being attached to a brake actuating wire secured to a brake pad actuating mechanism associated with said rear support wheel.

14. A walker apparatus as claimed in claim 1 wherein said handle grip is secured to a telescopically adjustable handle tubular support adjustably connected with a top end section of each said directional rods.

* * * * *